United States Patent
Vangala et al.

(10) Patent No.: US 9,935,859 B2
(45) Date of Patent: Apr. 3, 2018

(54) LOAD ESTIMATION IN 3GPP NETWORKS

(71) Applicant: Apple Inc., Cupertino, CA (US)

(72) Inventors: Sarma V. Vangala, San Jose, CA (US); Tarik Tabet, Los Gatos, CA (US); Swaminathan Balakrishnan, Santa Clara, CA (US); Yuchul Kim, Santa Clara, CA (US); Navid Damji, Cupertino, CA (US); Sreevalsan Vallath, Dublin, CA (US); Samy Khay-Ibbat, San Francisco, CA (US); Syed Aon Mujtaba, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 223 days.

(21) Appl. No.: 14/870,328

(22) Filed: Sep. 30, 2015

(65) Prior Publication Data

US 2016/0020983 A1    Jan. 21, 2016

Related U.S. Application Data

(60) Division of application No. 13/867,584, filed on Apr. 22, 2013, now Pat. No. 9,185,587, and a continuation-in-part of application No. 13/777,454, filed on Feb. 26, 2013, now Pat. No. 8,958,799.

(60) Provisional application No. 61/789,104, filed on Mar. 15, 2013, provisional application No. 61/715,509, filed on Oct. 18, 2012.

(51) Int. Cl.
*H04W 24/00* (2009.01)
*H04L 12/26* (2006.01)
*H04W 24/06* (2009.01)
*H04W 24/08* (2009.01)
*H04B 17/309* (2015.01)

(52) U.S. Cl.
CPC ....... *H04L 43/0888* (2013.01); *H04B 17/309* (2015.01); *H04L 43/10* (2013.01); *H04W 24/06* (2013.01); *H04W 24/08* (2013.01)

(58) Field of Classification Search
None
See application file for complete search history.

(56) References Cited

U.S. PATENT DOCUMENTS

| 7,480,519 B2 | 1/2009 | Jeong et al. | |
| 2002/0114280 A1* | 8/2002 | Yi | H04B 7/2612 370/235 |
| 2003/0058923 A1* | 3/2003 | Chen | H04B 1/7143 375/133 |

(Continued)

FOREIGN PATENT DOCUMENTS

| WO | 2009057960 A2 | 5/2009 |
| WO | 2012065646 A1 | 5/2012 |
| WO | 2012110420 A1 | 8/2012 |

*Primary Examiner* — Robert C Scheibel
*Assistant Examiner* — Gautam Sharma
(74) *Attorney, Agent, or Firm* — Meyertons Hood Kivlin Kowert & Goetzel, P.C.; Jeffrey C. Hood

(57) ABSTRACT

Loading estimation of 3GPP networks. One or more metrics relating to a cell of a 3GPP network may be measured. Loading of the cell may be estimated based on the one or more metrics. The metrics may include metrics measured, estimated, or derived at multiple layers, possibly including one or more of physical layer, radio link control layer, radio resource control layer, or application layer metrics.

18 Claims, 4 Drawing Sheets

(56) References Cited

U.S. PATENT DOCUMENTS

| | | | |
|---|---|---|---|
| 2003/0095503 A1* | 5/2003 | Ha | H04L 12/5601 370/232 |
| 2004/0052234 A1* | 3/2004 | Ameigeiras | H04L 1/1642 370/338 |
| 2006/0018277 A1* | 1/2006 | Petrovic | H04L 47/50 370/329 |
| 2007/0133405 A1* | 6/2007 | Bowra | H04L 43/00 370/230 |
| 2007/0253447 A1* | 11/2007 | Jiang | H04L 1/0083 370/474 |
| 2008/0085712 A1* | 4/2008 | Han | H04W 36/04 455/440 |
| 2008/0220784 A1 | 9/2008 | Somasundaram et al. | |
| 2009/0042601 A1 | 2/2009 | Wang et al. | |
| 2009/0046665 A1 | 2/2009 | Robson et al. | |
| 2010/0316021 A1 | 12/2010 | Lerzer et al. | |
| 2012/0099458 A1 | 4/2012 | Ezaki et al. | |
| 2013/0040683 A1 | 2/2013 | Siomina et al. | |
| 2013/0225106 A1 | 8/2013 | Clevorn et al. | |
| 2013/0279470 A1 | 10/2013 | Sen et al. | |
| 2014/0029455 A1 | 1/2014 | Vitthaladevuni et al. | |
| 2014/0056233 A1 | 2/2014 | Hedlund et al. | |
| 2014/0087734 A1 | 3/2014 | Wang et al. | |
| 2014/0112172 A1 | 4/2014 | Vangala et al. | |

* cited by examiner

US 9,935,859 B2

LOAD ESTIMATION IN 3GPP NETWORKS

PRIORITY CLAIM

The present application is a divisional of U.S. application Ser. No. 13/867,584 titled "Load Estimation in 3GPP Networks", filed on Apr. 22, 2013, which claims benefit of priority to U.S. Provisional Application No. 61/789,104 titled "Load Estimation in 3GPP Networks", filed on Mar. 15, 2013, and which is a continuation-in-part of U.S. application Ser. No. 13/777,454 titled "Wireless Device Based Inter Radio Access Technology Handover Initiation", filed on Feb. 26, 2013, which claims benefit of priority to U.S. Provisional Application No. 61/715,509 titled "Wireless Device Based Inter Radio Access Technology Handover Initiation", filed on Oct. 18, 2012, all of which are hereby incorporated by reference in their entirety as though fully and completely set forth herein.

FIELD

The present disclosure relates to the field of wireless communication, and more particularly to a system and method for a wireless user equipment (UE) device to estimate cellular network loading.

DESCRIPTION OF THE RELATED ART

Wireless communication systems are rapidly growing in usage. Further, wireless communication technology has evolved from voice-only communications to also include the transmission of data, such as Internet and multimedia content. There exist numerous different wireless communication technologies and standards. Some examples of wireless communication standards include GSM, UMTS (WCDMA), LTE, LTE Advanced (LTE-A), 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others. Some of these standards may serve complementary functions while others may typically be considered competitors attempting to fulfill similar needs amongst consumers.

Cellular networks, in particular, are generally provided by way of various network infrastructure components, typically including numerous base transceiver stations, switches, routers, and various other network infrastructure components. The resulting network may be able to provide cellular communication services to subscribers of that network within a service territory encompassed by the network. At various times, different numbers of subscribers may use services in different portions of such a service territory, cumulatively representing different (localized and overall) network 'loads'. For many networks, network resources are dynamically allocated to subscribers such that relatively fewer network resources are available per-subscriber at times and locations where heavy network loading is occurring (e.g., as those resources are distributed between a larger number of subscribers), while relatively greater network resources are available per-subscriber at times and locations where lighter network loading is occurring (e.g., as there may be less competition for those resources).

Accordingly, network loading may be a significant factor in the performance (e.g., throughput, quality of service, battery performance) of subscribers of a network. However, currently, high-quality information on loading of cellular networks' infrastructure is available only to the operators of those networks (i.e., cellular carriers). Cellular devices subscribed to networks are not themselves identifying or estimating network loads, or being provided with such information by the network operators. Those devices are thus unable to make use of information which significantly affects their performance. Accordingly, improvements in wireless communications would be desirable.

SUMMARY

In light of the foregoing and other concerns, it would be desirable to provide a way for a wireless user equipment (UE) device to estimate the loading on cellular networks.

Enabling a device to estimate the load on a network which provides communication services to that device may facilitate better decision making by that device in a variety of ways. For example, any number of operational algorithms enacted at various layers (e.g., physical layer, link layer, application layer) may be optimized based on network load estimates, in particular as it may directly affect throughput, quality of service, battery usage, and various other factors.

Further advantages may be gained by enabling a device to estimate the load on other available networks in addition to a network which is currently serving the device. For example, if a device is able to estimate the load on its current network and another available network, the device may be able to determine, in view of relative loading and underlying capabilities of those networks, whether the current network or the other available network would likely provide better throughput, quality of service, and/or battery performance to the device. An example of such a situation might occur if a network operator provides co-located networks which operate according to different radio access technologies (RATs), such as a third-generation cellular technology (e.g., UMTS) and a fourth-generation cellular technology (e.g., LTE). As the later-generation cellular technology becomes more prevalent, it may become common in such a situation for the network operated according to the later-generation cellular technology to be more heavily loaded than the network operated according to the earlier-generation cellular technology. Thus despite lesser underlying capabilities, due to the relative loading, it may be possible in such a situation for the network operated according to the earlier-generation cellular technology to provide better throughput, quality of service, and/or battery performance to a device which is capable of utilizing either network.

Embodiments of the disclosure may thus be directed to a method for a wireless user equipment (UE) device to estimate loading in cellular networks, to a UE device configured to implement such a method, and/or to a non-transitory computer accessible memory medium storing program instructions executable by a processor to implement such a method. The UE device may include one or more antennas for performing wireless communication. The UE device may also include a processing element configured to implement part or all of the method (e.g., by executing program instructions). In addition, the UE device may include a non-transitory computer accessible memory medium, which may store program instructions executable by the UE.

The actual techniques used to estimate loading in various cellular networks may include any of a variety of techniques and may be based on any of a variety of metrics. Some of those metrics may include physical layer derived metrics such as received signal strength indicator (RSSI) measurements and various derived or measured interference metrics, upper layer estimations based on served percentage calculations, block error rate estimates, and other upper layer derived metrics, and/or a combination of upper layer and lower layer metrics, among various possibilities.

BRIEF DESCRIPTION OF THE DRAWINGS

A better understanding of the present subject matter can be obtained when the following detailed description of the preferred embodiment is considered in conjunction with the following drawings, in which.

Figure 1:
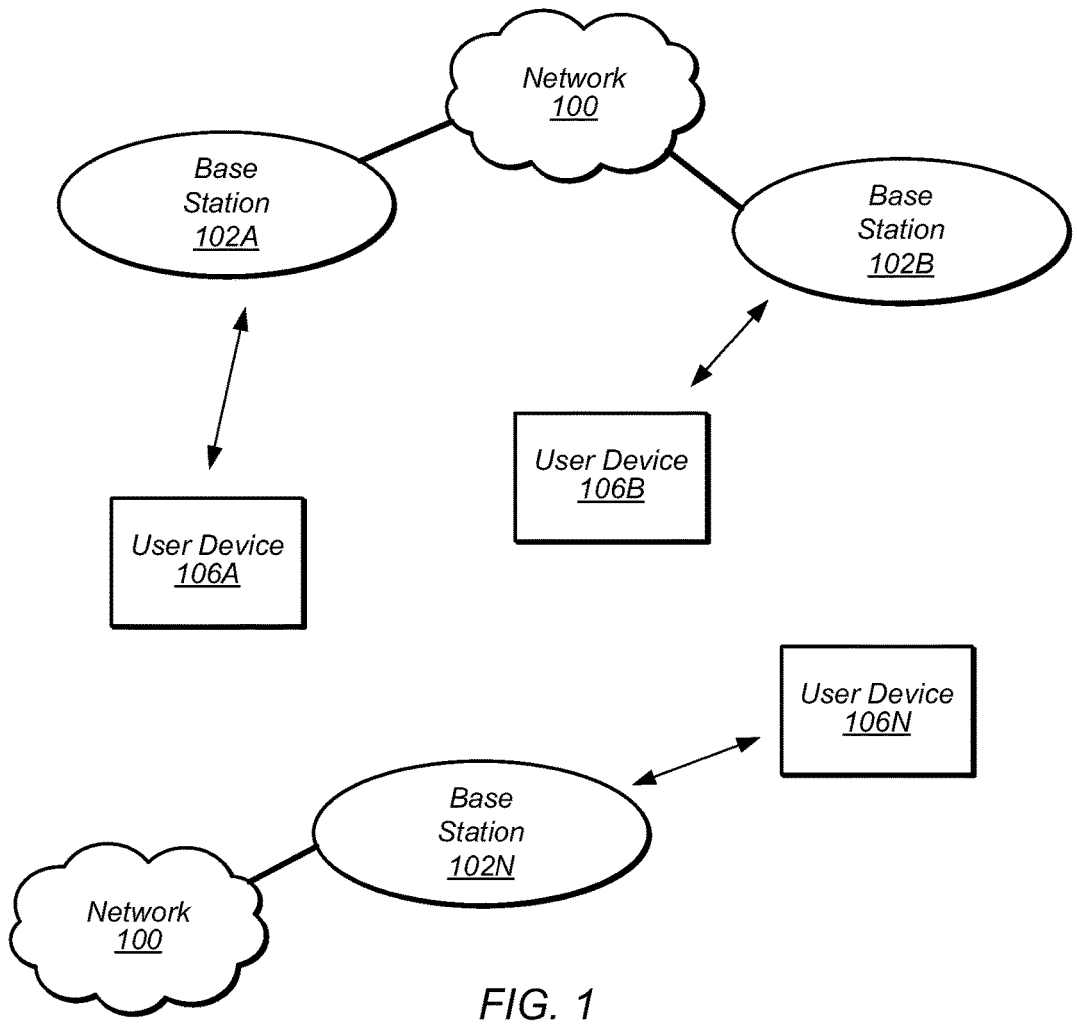
FIG. 1 illustrates an exemplary wireless communication system.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

The following acronyms are used in the present disclosure.

3GPP: Third Generation Partnership Project
3GPP2: Third Generation Partnership Project 2
GSM: Global System for Mobile Communications
UMTS: Universal Mobile Telecommunications System
HSPA: High Speed Packet Access
LTE: Long Term Evolution
LTE-A: LTE-Advanced Terms The following is a glossary of terms used in the present disclosure:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
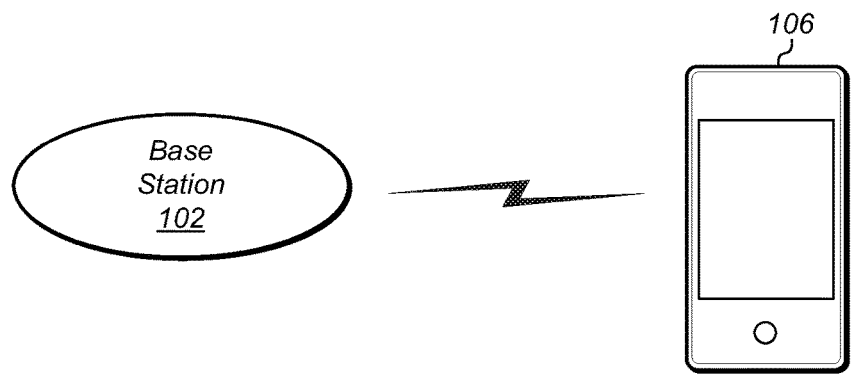
FIG. 2 illustrates an exemplary base station in communication with an exemplary user equipment device.

FIGS. 1-2—Communication System

FIG. 1 illustrates an exemplary (and simplified) wireless communication system. It is noted that the system of FIG. 1 is merely one example of a possible system, and embodiments may be implemented in any of various systems, as desired.

As shown, the exemplary wireless communication system includes base stations 102A, 102B, etc., through 102N which communicate over a transmission medium with one or more user devices 106A, 106B, etc., through 106N. Each of the user devices may be referred to herein as a "user equipment" (UE). Thus, the user devices are referred to as UEs or UE devices.

The base stations 102A-102N may be base transceiver stations (BTS) or cell sites, and may include hardware that enables wireless communication with the user devices 106A-106N. A base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100.

The base stations 102 and the user devices 106 may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1xRTT, 1xEV-DO, HRPD, eHRPD), Wi-Fi, WiMAX etc.

Note that a UE 106 may also be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). The UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

Base stations 102A-102N and other similar base stations operating according to the same or different cellular communication standards may thus be provided as one or more networks of cells, which may provide continuous or nearly continuous overlapping service to UE 106 and similar devices over a wide geographic area via one or more cellular communication standards.

UEs 106A-106N may be capable of communicating with any of base stations 102A-102N, possibly even if some of base stations 102A-102N operate according to different RATs. For example, UE 106A may communicate with base station 102A as its "serving" base station, and may also monitor signals from base stations 102B and 102N (and possibly any other nearby base stations), e.g., to ensure that the UE 106A is being provided with the best possible service. If it were to be determined that base station 102N might provide better service than base station 102A, the UE might perform a "handover" from the cell provided by base station 102A to the cell provided by base station 102N, such that the base station 102N would then be the serving base station for UE 106A. If base station 102N operates according to a different RAT than base station 102A, the handover may be an inter radio access technology (iRAT) handover.

Note also that if desired, some or all base stations may be capable of operating according to multiple radio access technologies. For example, a base station may be a multi-mode base station configured to operate (e.g., provide service) according to any one of multiple radio access technologies at any given time, or may even be configured to operate according to multiple radio access technologies simultaneously. As another possibility, multiple base stations which operate according to different RATs may be co-located; in other words, equipment providing cells according to each of multiple RATs may be located in close proximity to each other, such that the cells provided may substantially or entirely overlap.

FIG. 2 illustrates user equipment 106 (e.g., one of the devices 106A through 106N) in communication with a base station 102 (e.g., one of the base stations 102A through 102N). The UE 106 may be a device with wireless network connectivity such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using two or more of GSM, UMTS, CDMA2000, LTE, LTE-A, WLAN, or GNSS. Other combinations of wireless communication standards are also possible.

The UE 106 may include one or more antennas for communicating using one or more wireless communication protocols. The UE 106 may share one or more parts of a receive and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using any of LTE, UMTS, or GSM, and separate radios for communicating using each of Wi-Fi and Bluetooth. As a still further possibility, the UE might include multiple receive and/or transmit RF chains capable of operating according to a single wireless communication protocol (or any of multiple wireless communication protocols), such as in order to implement carrier aggregation (e.g., in LTE) and/or dual carrier HSPA (DC-HSPA). Other configurations are also possible.

Figure 3:
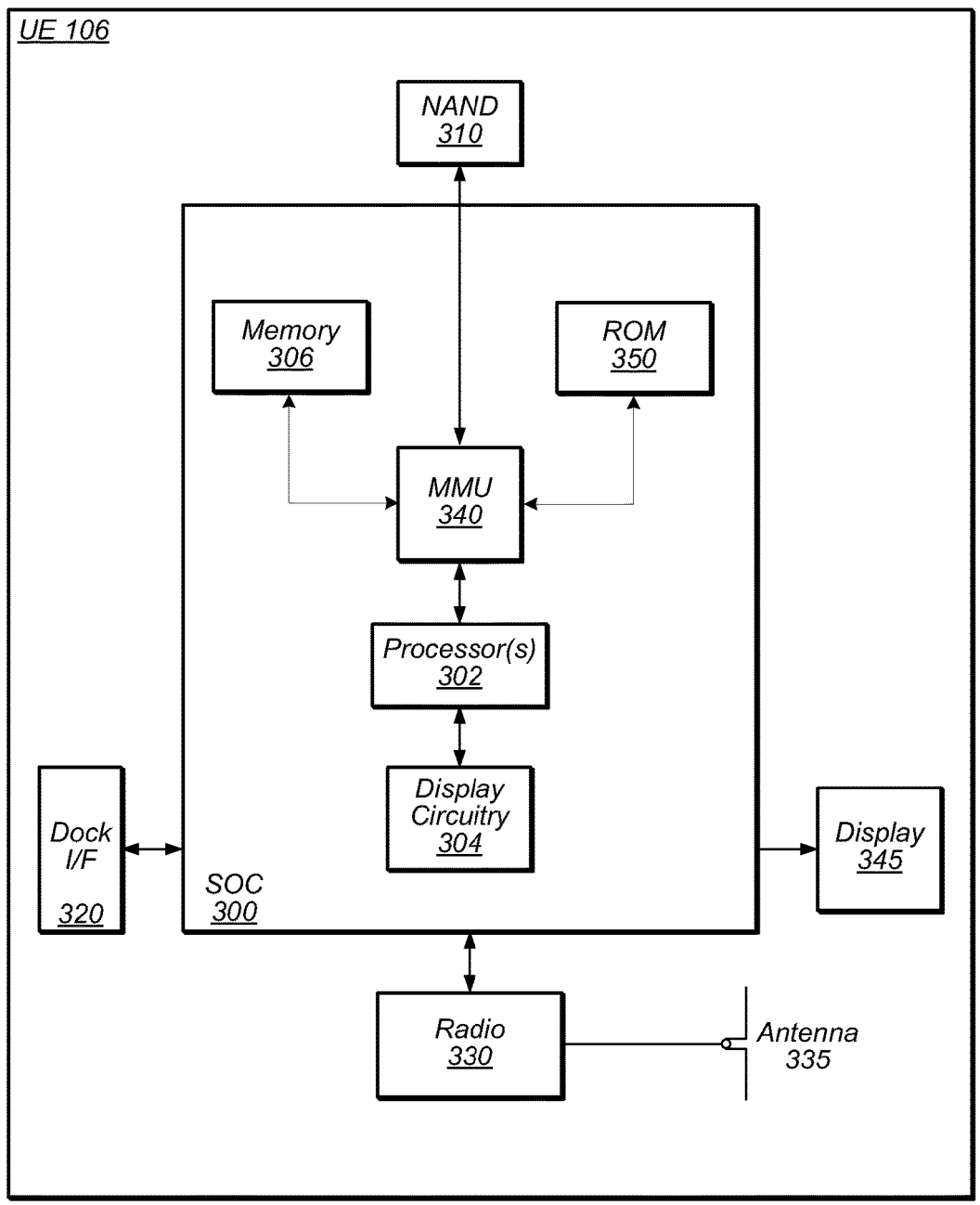
FIG. 3 illustrates an exemplary block diagram of a user equipment device.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 345. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 345. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 345, and wireless communication circuitry 330, also referred to as a radio (e.g., for UMTS, LTE, LTE-A, CDMA2000, Bluetooth, Wi-Fi, GPS, etc.).

The UE device 106 may include at least one antenna, and possibly multiple antennas, for performing wireless communication with base stations and/or other devices. For example, the UE device 106 may use antenna 335 to perform the wireless communication. As noted above, the UE may be configured to communicate wirelessly using multiple wireless communication standards.

The UE 106 may also include and/or be configured for use with one or more user interface elements. The user interface elements may include any of various elements, such as display 345 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

The UE 106 may be configured to estimate loading of cellular networks. In particular, as described further subsequently herein, the UE 106 may include hardware and software components for implementing part or all of a method for estimating loading of a cellular network.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

Figure 4:
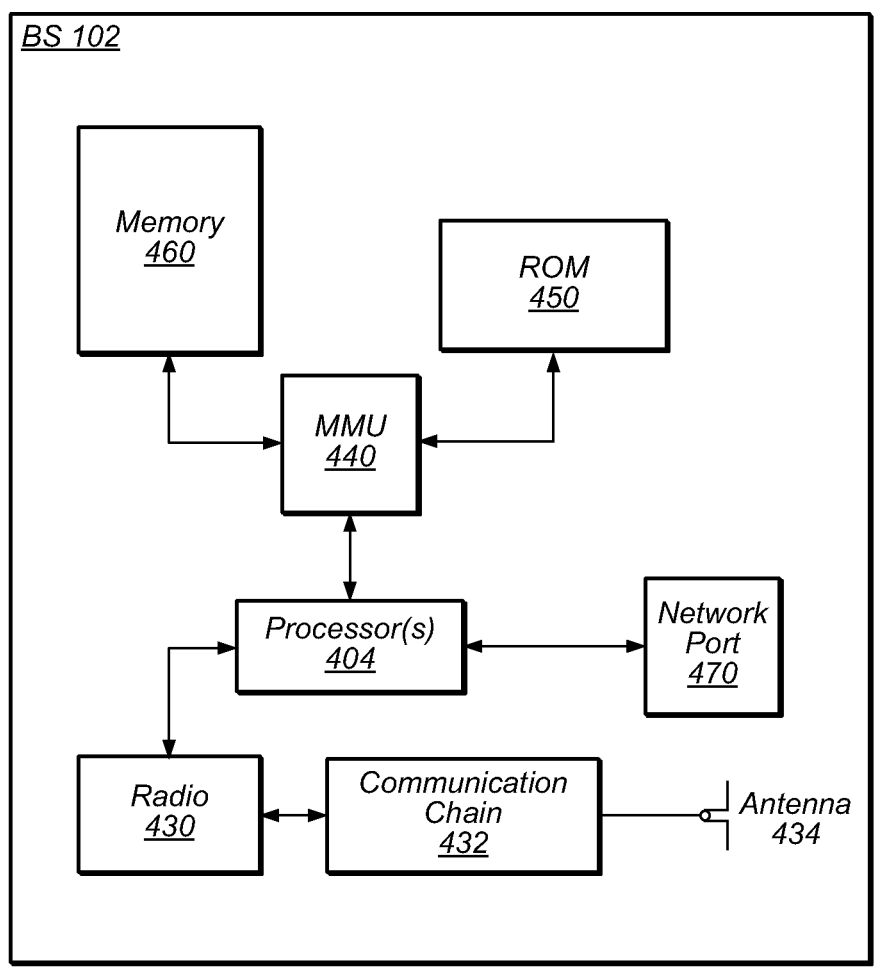
FIG. 4 illustrates an exemplary block diagram of a base station.

FIG. 4—Exemplary Block Diagram of a Base Station

FIG. 4 illustrates an exemplary block diagram of a base station (BS) 102. It is noted that the base station of FIG. 4 is merely one example of a possible base station. As shown, the base station 102 may include processor(s) 404 which may execute program instructions for the base station 102. The processor(s) 102 may also be coupled to memory management unit (MMU) 440, which may be configured to receive addresses from the processor(s) 102 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, WCDMA, CDMA2000, etc.

The base station 102 may be configured to support network load estimation by a UE 106. In particular, as described further subsequently herein, the BS 102 may include hardware and software components for implementing (or for use in conjunction with a UE 106 implementing) part or all of a method for a UE to estimate network loading.

The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

Figure 5:
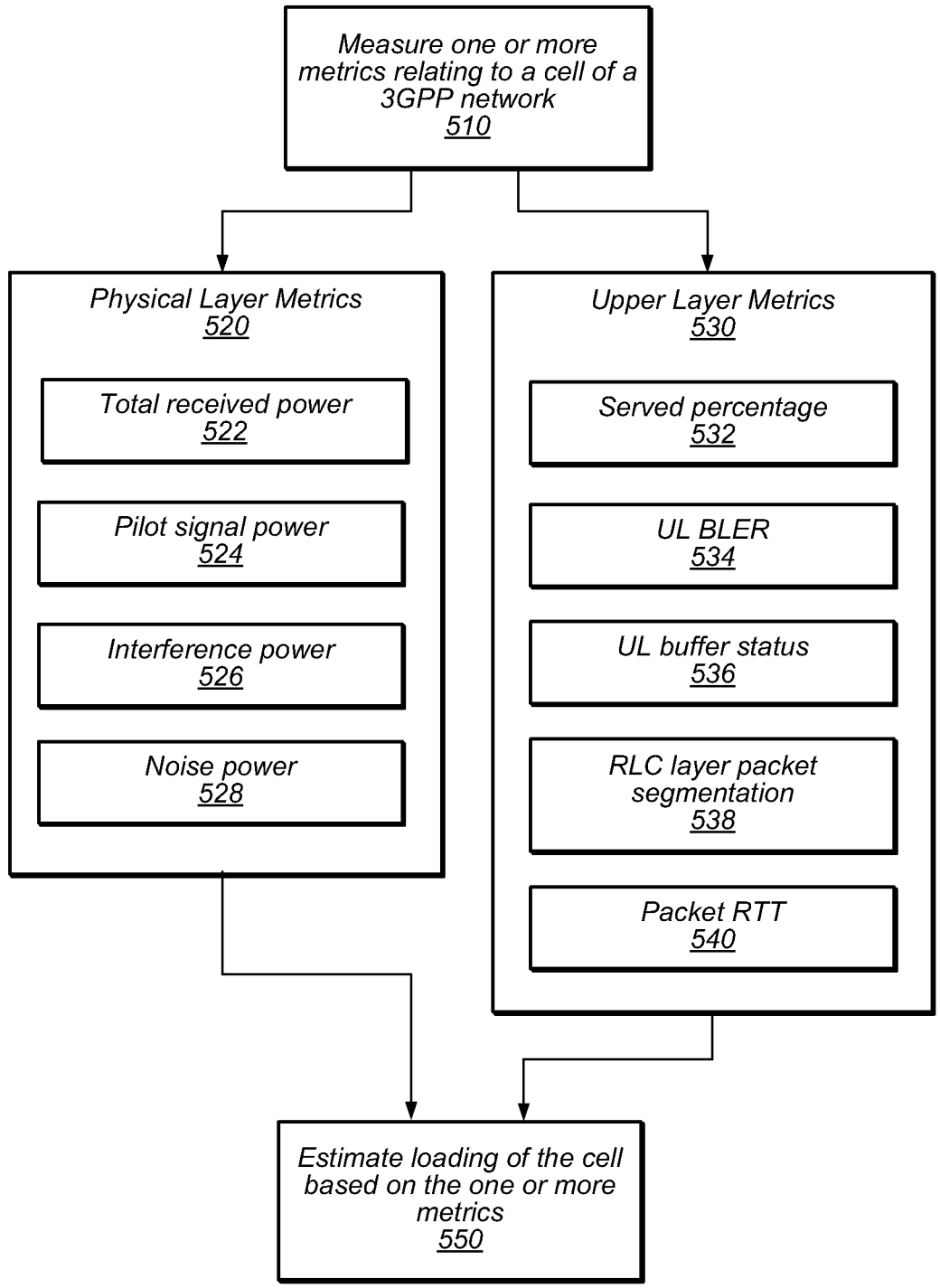
FIG. 5 is a flowchart diagram illustrating an exemplary method for estimating cellular network loading by a user equipment device.

FIG. 5—Load Prediction Flowchart

FIG. 5 is a flowchart diagram illustrating a method for estimating or predicting loading of given cell in a cellular network. The cellular network may operate according to a 3GPP standard, such as UMTS or LTE, among various possibilities.

In 510, a UE 106 may measure one or more metrics relating to the cell of the cellular network. The cell may be a serving cell of the UE 106. Alternatively, if desired, the cell may be a cell corresponding to an alternate network (i.e., a network which is not currently serving the UE 106), which may or may not operate according to a different radio access technology.

The one or more metrics may include one or more physical layer metrics 520 and/or one or more upper layer metrics 530. For example, physical layer metrics might include one or more of total received power 522, pilot signal power 524, interference power 526, and/or noise power 528. Upper layer metrics might include one or more of served percentage 532, uplink (UL) block error rate (BLER) 534 (e.g., as might be estimated from downlink (DL) ACK/NACKs received from a base station 102), UL buffer status 536, radio link control (RLC) layer packet segmentation 538, and/or packet round-trip-time (RTT) 540.

Note that in at least some scenarios, it may be desirable to perform one or more comparisons using one or more of the metrics and a predetermined threshold. For example, for some physical layer metrics, various signal strength, noise, and interference metrics may be compared to determine approximately how much of a cell's capacity is being used, which may be one possible measurement of cell loading.

In 550, a UE 106 may estimate loading of the cell based on the one or more metrics, and possibly further based on the one or more comparisons. The estimate may be performed in any of a variety of ways, depending on the radio access technology according to which the network operates and nature of the metrics involved. As noted above, the metrics may include physical layer metrics (e.g., RSSI and other signal strength metrics, and/or possibly measured or derived interference metrics) and/or higher layer metrics (e.g., RRC, RLC, application layer metrics) such as served percentage, uplink block error rates, degree of RLC packet segmentation observed, application layer packer error rate, RTT estimates, and/or any of various other metrics. Detailed examples of various metrics which may be measured and/or derived and used to estimate network loading in various ways are provided hereinbelow.

As one possibility for UMTS networks, load prediction may be performed based on noise and interference estimation, both in connected and idle modes. For example, a UE 106 evaluating a UMTS cell may measure a metric commonly referred to as $E_c/N_o$, which may include noise and interference measurements, and may be usable to estimate network loading.

The "$E_c$" portion may refer to the common pilot channel (CPICH) power of the cell, which may typically be within 5% and 15% of cell's total transmit power. For example, $E_c$ might typically be 10% of the total transmit power of the base station providing the cell in question. Other values are of course also possible. The "$N_o$" portion may represent the total received power by the UE 106, and may include several components. In particular, $N_o$ may include the total received power from the cell of interest ("Ior") plus the total interference power from other cells ("Ioc") plus the power of thermal noise ("Nt").

Although a single measured $E_c/N_o$ value may be used directly as a rough estimate of cell loading, it may be more effective to filter the most recent $E_c/N_o$ measurement over multiple samples in order to obtain a less volatile prediction of loading of the UMTS cell. As one possible filter, consider the following equation:

$$f((E_c/N_o)_i) = (1-\alpha)f((E_c/N_o)_{i-1}) + \alpha(E_c/N_o)_i$$

In which $(E_c/N_o)_i$ represents the ith measurement of $E_c/N_o$ (e.g., in dB), $\alpha$ is a scaling factor which may be selected as desired, e.g., depending on the desired relative weighting of current and previous measurements, and $f(E_c/N_o)$ is the filtered value of $E_c/N_o$ over multiple samples.

If the filtered Ec/No value is larger than a certain (e.g., preconfigured) threshold "TH1", this may imply that the UMTS cell in question is lightly loaded, since this may indicate that relatively little of the cell's potential power is currently being used.

Note that if the UMTS cell for which loading is being estimated is not the serving cell of the UE 106, in particular if the serving cell of the UE 106 operates according to LTE, the UE 106 may measure the $E_c/N_o$ value of the UMTS cell during measurement gaps of LTE. Alternatively (as described further subsequently herein), if UE 106 is carrier aggregation (CA) capable, the UE 106 may be able to tune one RF capability to the UMTS cell to perform $E_c/N_o$ measurements while the main RF capability remains tuned to the serving cell of the UE 106.

For LTE networks, load prediction may also be performed based on noise and interference estimation, if desired.

A UE 106 in an LTE network may determine its resource block (RB) allocation via the physical downlink control channel (PDCCH). Any RBs which are not specifically allocated to the UE 106 may be either empty (not used/allocated) or allocated to other UEs. By determining how many RBs are being allocated of the total possible RBs available from the serving cell, a UE 106 may be able to estimate the total load on the serving cell.

In some LTE deployments (e.g., depending on network configuration, such as whether measurements are performed in the time domain or the frequency domain), it may be possible for a UE 106 to measure total received power (RSSI) on a per RB basis. In this case the UE 106 may also have available (e.g., for channel estimation purposes) an estimate of the noise (Nt) plus interference (Ioc) power available for each RB. By comparing the RSSI of a given RB to the noise plus interference power of that RB, the UE 106 may be able to determine whether that RB is used by the cell to transmit data to another UE. For example, if the RSSI is higher than the noise plus interference power by at least a certain threshold, this may be an indication that that RB is allocated to another UE.

Thus, if a UE 106 performs such comparisons for all RBs not known to be allocated to the UE 106 itself, the UE 106 may be able to determine on that basis what proportion of the total RBs available to the cell are currently allocated, which may serve as a good estimate or prediction of the current loading of the cell in question.

Note that it may also be possible for a UE 106 to do such a comparison for a group of RBs instead of on an individual (per-RB) basis. Further, such a computation may be sub-sampled in the time domain, or filtered in the time domain, if desired, e.g., depending on the complexity and time frame over which load estimation is desired.

As another possibility, load estimation may also or alternatively be performed in LTE networks based on RSSI and reference signal received power (RSRP) measurements. In particular, the RSSI, serving cell RSRP, and neighbor cell RSRP per RB may be related as follows on a linear scale:

$$RSSI(m) = 2\left(RSRP_S + \sum_{k=1}^{K} RSRP_{N_K}\right) +$$

$$10c\left(RSRP_S I_S(m) + \sum_{k=1}^{K} RSRP_{N_K} I_{N_K}(m)\right) + N(m)$$

where:
m—RB index;
$RSRP_S$—RSRP of the serving cell
$I_S(m)$—Indicator Function for m-th RB allocation for the serving cell
equal to 1 when the m-th RB is allocated in the serving cell, equal to 0 when the m-th RB is not allocated in the serving cell;

$I_{N_k}(m)$—Indicator Function for m-th RB allocation for $N_k$-th neighboring cell equal to 1 when the m-th RB is allocated in the neighboring cell, equal to 0 when the m-th RB is not allocated in the neighboring cell;

c—Scalar to account for the Data Resource Elements (RD) scaling with respect to pilots; and N(m)—Noise Power in m-th RB K—number of neighboring cells to be considered Thus, if RSSI can be measured per RB (as may be possible in at least some LTE deployments, as noted above), the load $L_S$ on the serving cell can be estimated using the following definition of the load $L_S$:

$$L_S = \frac{\sum_{m=1}^{M} I_S(m)}{M}$$

where M is the system bandwidth in terms of number of RBs, and where the indicator function I(m) for each RB m is determined as follows:

$$I_S(m) = \begin{cases} 1 & \text{if } RSSI(m) > 2\left(RSRP_S + \sum_{k=1}^{K} RSRP_{N_K}\right) + \\ & 10c\sum_{k=1}^{K} RSRP_{N_K} + N(m) + \lambda_1, \lambda_1 > 0 \\ 0 & \text{otherwise} \end{cases}$$

where $\lambda_1$ is a threshold configured to facilitate differentiation between RBs which are allocated and empty RBs.

However, as also previously noted, in some LTE deployments, it may not be possible to measure RSSI on a per RB basis. In those deployments, it may still be possible to estimate the loading of a serving cell, if certain assumptions are made. First consider that the total RSSI may be represented as:

$$RSSI = \sum_{m=1}^{M} RSSI(m) = 2\left(RSRP_S + \sum_{k=1}^{K} RSRP_{N_k}\right) +$$

$$10c\left(RSRP_S \sum_{m=1}^{M} I_S(m) + \sum_{k=1}^{K} RSRP_{N_k} \sum_{m=1}^{M} I_{N_k}(m)\right) + \sum_{m=1}^{M} N(m)$$

Under the assumption that the serving and neighbor cells are equally loaded (which may or may not be valid), i.e.:

$$L = L_S = \frac{\sum_{m=1}^{M} I_S(m)}{M} = L_{N_k} = \frac{\sum_{m=1}^{M} I_{N_k}(m)}{M}$$

$$N = \sum_{m=1}^{M} N(m)$$

the total RSSI may be re-written as:

$$RSSI = (2 + 10*c*L*M)*\left(RSRP_S + \sum_{k=1}^{K} RSRP_{N_k}\right) + N$$

and accordingly, the load can be estimated as:

$$L = \frac{1}{10*c*M}\left(\frac{(RSSI - N)}{\left(RSRP_S + \sum_{k=1}^{K} RSRP_{N_k}\right)} - 2\right).$$

In addition to such physical layer based metrics, higher layer metrics (e.g., metrics measured, estimated, or derived at any of various layer 2 or 3 entities or sublayers such as media access control (MAC), radio link control (RLC), or radio resource control (RRC), or metrics measured, estimated, or derived at an application layer) may also or alternatively be used to estimate network loading in an LTE network. It is worth noting, however, that such estimations may be possible only while the UE 106 is in connected mode, since the upper layer derived metrics may not be measured (e.g., as those upper layers may not be active) if no data transfers are active.

As one example, served percentage calculations (the percentage of the resources (e.g., RBs) of a base station provided to the UE 106) maintained by a UE 106 may be used to generate a good estimation of the load on the network, if desired. In particular, based on network scheduling (and if frequency selective scheduling is available), the RB allocations may vary in fixed patterns based on load. As one example, for one possible scheduler implementation, the number of physical resource blocks (PRBs) allocated can be 50, with a variation in the served percentage depending on loading of the cell. Accordingly, the served percentage can be used in determining the load based on the allocation in the time domain. As another example, the number of PRBs allocated may be directly in proportion to the served percentage. Thus in a scenario in which only 2 UEs are served by a cell, each UE would be allocated 25 PRBs. Thus as long as the UE 106 is provided with (or is otherwise able to gain) an understanding of, or is able to reasonably guess at, the network's scheduling algorithm, the UE 106 may be able to accurately estimate the load on the network based on the served percentage of the UE 106.

Note that in the case of uplink load estimations, the buffer status of the UE 106 (e.g., the buffer status report or BSR, which the UE 106 may transmit to the serving cell for use in allocating uplink grants) may need to be considered along with the rate at which the UE 106 is being served. For example, if the buffers of the UE 106 are not full (e.g., if little or no data is presently being transferred), the cell may not allocate as many PRBs to the UE 106 as it would if the buffers of the UE 106 are full, which may distort a load estimation based on served percentage of the UE 106.

Further, it may be desirable to maintain a hysteresis with respect to historical buffer status conditions, in order to eliminate non full-buffer users (e.g., users performing non-continuous transmissions, such as web browsing or messaging transmissions) entering and leaving the system. Note that too big of a history may cause errors resulting from under-estimating non full-buffer users, while too small of a history may cause errors resulting from over-estimating non full-buffer users.

Another way of determining congestion or loading of a cell may include using uplink (UL) block error rate (BLER) as a metric. In particular, when the UL BLER and the path loss remains relatively constant over a period of time, UL buffer size and grant statistics could be used as a metric to determine the load on an LTE cell.

For example, as noted above, the UE 106 may provide a buffer status report (BSR) to the network, which may be used by the network to allocate UL grants. In typical conditions of no load and constant BLER conditions, the UL buffers tend to be lower in size, as the network may provide sufficient UL allocations. However, in loaded conditions, insufficient UL grants to clear the buffers of the UE 106 may cause an increase in the UL buffer sizes. Accordingly, a UE 106 might estimate UL BLER and path loss, possibly over a period of time (e.g., in a time-filtered manner), and if it is determined that UL BLER and path loss are relatively constant (e.g., within certain predetermined or dynamic thresholds and/or having a variability within a predetermined tolerance), the UE 106 may estimate loading of the serving cell based on UL buffer sizes over that period of time. In such a case, UL buffer sizes may be a relatively accurate empirical measure of the load in the serving cell.

Certain radio link control (RLC) layer metrics may also or alternatively be used for load estimation purposes, if desired. For example, given an application layer packet of m bytes arriving in the input buffer of the serving base station of a UE 106, the base station may determine the number of RBs needed to transmit the packet. In high loading scenarios, the RLC may need to segment the packet and transmit it over multiple transmission time intervals (TTIs). Accordingly, the degree to which a UE 106 experiences packet segmenting at the RLC layer over multiple TTIs may be used as an approximate indicator of system loading. Thus, the UE 106 may estimate a degree of segmentation (e.g., percentage of application layer packets which experience RLC segmentation, average number of RLC packets into which an application layer packet is segmented, etc.), and use that as a metric with which to estimate cell loading, if desired. In such cases, a greater degree of segmentation may indicate greater cell loading, while a lesser degree of segmentation may indicate a lesser cell loading.

Additionally, application layer measurements may be used to estimate network loading in some cases, if desired. For example, the UE 106 may monitor the round trip time (RTT) of transmissions, and/or the application packet loss rate, over time. Relatively higher RTTs and application packet loss rates may typically correspond to greater system loads, and thus may also be used as an approximate indicator of system loading, if desired.

Note that a LTE carrier aggregation (CA) capable UE 106 or Dual Carrier HSPA (DC-HSPA) UE may be able to estimate network loading of alternate networks more efficiently than a UE 106 which is not CA capable. In particular, such a UE may be able to use its main RF capability to measure the cell it is camping on or connected to. The UE's other RF capability may be tuned to another network (e.g., which may operate according to a different radio access technology) in order to estimate loading on that network while simultaneously remaining connected to its serving cell. In this manner, more accurate and timely measurements can be made, leading to more timely decisions (such as whether or not to migrate to the alternate network) and/or behavior modifications based on the load estimate(s).

However, even if a UE 106 is not CA capable, the UE may still be able to perform network load estimates. In particular, the UE 106 may use gap measurements (e.g., if served by an LTE cell) or compressed mode (e.g., if served by a UMTS/WCDMA cell) in to make load measurements/estimations of other networks.

Thus, a UE 106 may be able to measure and/or derive any of a variety of metrics and to estimate loading on a cell based on those metrics. This may provide numerous advantages to the UE 106, particularly in terms of optimizing its operation (e.g., based on more accurate performance expectations) based on application profile and performance requirements (e.g., throughput, quality of service, battery). For example, certain network-dependent applications (e.g., video chatting applications) might modify their scheduling or other behaviors to improve performance depending on the loading of the cell, given an estimate of the loading of the cell.

A particularly significant advantage to providing a UE 106 with the capability to estimate network loading may include improving the ability of the UE 106 to determine whether better performance would be obtained by remaining with the current serving network of the UE 106 or by re-selecting to a cell corresponding to a different network (e.g., which may operate according to a different radio access technology). By re-selecting to a cell with significantly lower loading on the basis of loading estimates such as might be obtained using the techniques described herein, the UE 106 may be able to significantly improve its performance.

However, it is worth considering the possibility that with widespread deployment of such techniques, unless careful consideration is given to handover/reselection techniques based on network loading estimates, a ping-pong effect between different networks might result. For example, if numerous UEs determine that one network is heavily loaded and an alternate network lightly loaded, and re-select to the alternate network within a short time period of one another, the result may be that the alternate network to which the UEs re-selected becomes heavily loaded while the original network becomes lightly loaded. This could result in some or all of those UEs re-selecting back to the original network. Such a cycle could be repeated indefinitely, to the detriment of overall performance and efficiency of both the individual UEs and the networks holistically.

In order to avoid such a scenario, any of a variety of techniques could be used. As one example, a hysteresis inducing factor might be introduced when comparing a serving network to an alternate network (e.g., biasing the comparison in favor of the serving network) in order to avoid re-selecting to an alternate network which would provide only a marginal improvement, if any, in performance.

As another example, a 'prohibition timer' might be introduced to discourage successive handovers/re-selections between two networks. For example, if a UE 106 re-selects to an alternate network, the prohibition timer might prevent re-selecting back to the original network at least until expiration of the prohibition timer.

As another possibility, a timer might be used to force a UE 106 to wait a certain period of time prior to re-selecting to an alternate network based on network loading. If desired, this timer may have a randomly selected value, e.g., in order to reduce the statistic likelihood of numerous UEs moving to a network simultaneously (or within a short period of time) based on loading considerations, thereby heavily loading it. Note that a prohibition timer may also or alternatively be implemented with a randomly selected value, if desired.

As a still further possibility, given a determination that migrating to an alternate network is desired by a UE 106 at a particular time, a random number selection may be used by the UE 106 in order to decide if (or when) the UE 106 will actually migrate to an alternate network, such that in some cases a UE 106 may be allowed to migrate, while in other cases a UE 106 may be denied migration, based on the random number selected. Note that in such a case the UE 106 might still be able to migrate at a future time (e.g., upon a similar determination that migration to an alternate network is desired, but with a random number selection resulting in permitted migration) even if initially denied migration. This may similarly statistically reduce the chance that numerous UEs move to a network simultaneously. As a specific example, if a UE determines to migrate to an alternate network, a random number could be selected to determine in which system subframe the UE would then move to the alternate network; since different UEs would typically select different random numbers, it would be unlikely in such a scenario that two UEs which determine to migrate to an alternate network would do so simultaneously.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a user equipment (UE), a tablet computer, a wearable computer, etc.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer accessible memory medium comprising program instructions which, when executed at a wireless user equipment (UE) device, cause the UE device to:
   measure or estimate one or more upper layer metrics associated with a serving cell of the UE device, wherein the upper layer metrics comprise uplink block error rate (BLER) and uplink buffer size, wherein estimating the one or more upper layer metrics comprises:
      estimating the uplink BLER and uplink path loss for uplink transmissions over a period of time; and
      determine that the uplink BLER and the uplink path loss have a variability within a predetermined tolerance over the period of time; and
   estimate loading of the cell based at least in part on the one or more upper layer metrics, wherein estimating loading of the cell is based at least in part on UL buffer sizes over the period of time, wherein estimating loading of the serving cell based on UL buffer sizes over the period of time is performed based on determining that the uplink BLER and the uplink path loss have a variability within the predetermined tolerance over the period of time.

2. The memory medium of claim 1, wherein when executed, the program instructions further cause the UE device to:
   calculate the served percentage of the UE device; and
   determine a network resource scheduling algorithm used by the serving cell of the UE device to configure served percentages based on loading;
   wherein estimating loading of the serving cell is based at least in part on the served percentage of the UE device and the network resource scheduling algorithm.

3. The memory medium of claim 2,
   wherein estimating loading of the serving cell is further based on an uplink buffer status of the UE device.

4. The memory medium of claim 2,
   wherein calculating the served percentage of the UE device is performed a plurality of times over a period of time;
   wherein estimating loading of the serving cell is based on a time-filtered served percentage of the UE device.

5. The memory medium of claim 1, wherein when executed, the program instructions further cause the UE device to:
   determine a degree of application layer packet segmentation at the RLC layer;
   wherein estimating loading of the cell is based at least in part on the determined degree of application layer packet segmentation at the RLC layer, wherein a greater degree of application layer packet segmentation indicates greater loading of the serving cell.

6. The memory medium of claim 1, wherein when executed, the program instructions further cause the UE device to:
   measure packet RTT at an application layer;
   measure application layer packet loss rate;
   wherein estimating loading of the cell is based at least in part on measuring packet RTT and packet loss rate at the application layer, wherein greater packet RTTs and packet loss rates at the application layer indicate greater loading of the cell.

7. A wireless user equipment (UE) device, comprising:
   an antenna;
   a radio, operably coupled to the antenna; and
   a processing element, operably coupled to the radio;
   wherein the UE device is configured to:
      estimate uplink block error rate and path loss over a period of time;
      determine whether the uplink block error rate and path loss have a variability within a predetermined tolerance over the period of time;
      estimate loading of the serving cell based at least in part on uplink buffer sizes over the period of time if the uplink block error rate and path loss have a variability within the predetermine tolerance over the period of time.

8. The UE device of claim 7,
   wherein loading of the serving cell is estimated further based at least in part on an uplink buffer status of the UE device.

9. The UE device of claim 7, wherein the UE device is further configured to:
  calculate a served percentage of the UE device;
  determine a network resource scheduling algorithm used by a serving cell of the UE device;
  wherein said estimating loading of the serving cell is further based on the served percentage of the UE device and the network resource scheduling algorithm.

10. The UE device of claim 9, wherein the UE device is further configured to:
  calculate the served percentage of the UE device on a plurality of occasions;
  determine an average served percentage of the UE device based on calculating the served percentage of the UE device on the plurality of occasions; and
  wherein said estimate loading of the serving cell is further based on the average served percentage of the UE device.

11. The UE device of claim 7, wherein the UE device is further configured to:
  determine an amount of application layer packet segmentation performed at a radio link control layer; and
  wherein said estimate loading of the serving cell is further based on the determined amount of application layer packet segmentation at the radio link control layer, wherein a greater amount of application layer packet segmentation indicates greater loading of the serving cell.

12. The UE device of claim 7, wherein the UE device is further configured to:
  measure application packet round trip time;
  measure application packet loss rate; and
  wherein said estimate loading of the serving cell is further based on the measured application packet round trip time and application packet loss rate, wherein greater application packet round trip times and application packet loss rates indicate greater loading of the serving cell.

13. An apparatus, comprising:
  a processing element configured to:
    communicate with a serving cell over a wireless link;
    estimate uplink (UL) block error rate (BLER) and path loss of the wireless link over a period of time;
    determine whether UL BLER and path loss have a variability within a predetermined tolerance over the period of time;
    estimate loading of the serving cell based at least in part on UL buffer sizes over the period of time if UL BLER and path loss have a variability within the predetermined tolerance over the period of time.

14. The apparatus of claim 13, wherein the processing element is further configured to determine one or more upper layer metrics, comprising at least one of:
  served percentage;
  radio link control (RLC) layer packet segmentation; or
  application layer packet round trip time (RTT);
  wherein said estimating loading is based on the one or more upper layer metrics.

15. The apparatus of claim 13, wherein the processing element is further configured to:
  calculate a served percentage;
  determine a network resource scheduling algorithm used by the serving cell to configure served percentages based on loading; and
  wherein said estimating loading of the serving cell is further based on the served percentage and the network resource scheduling algorithm.

16. The apparatus of claim 13, wherein the processing element is further configured to:
  determine how much application layer packet segmentation is occurring at the RLC layer; and
  wherein said estimating loading of the serving cell is further based on how much application layer packet segmentation is occurring at the RLC layer.

17. The apparatus of claim 13, wherein the processing element is further configured to:
  measure packet round trip time (RTT) at an application layer;
  measure packet loss rate at the application layer; and
  wherein said estimating loading of the cell is further based on the measured packet RTT and packet loss rate at the application layer.

18. The apparatus of claim 13, wherein the apparatus is configured to communicate with the serving cell according to LTE.

* * * * *